United States Patent [19]

Nusbaumer et al.

[11] Patent Number: 4,607,873
[45] Date of Patent: Aug. 26, 1986

[54] GRIPPER APPARATUS

[75] Inventors: Kay T. Nusbaumer, Ft. Wayne; Bruce D. McIntosh, Monroeville, both of Ind.

[73] Assignee: PHD, Inc., Ft. Wayne, Ind.

[21] Appl. No.: 771,297

[22] Filed: Aug. 30, 1985

Related U.S. Application Data

[63] Continuation of Ser. No. 517,329, Jul. 26, 1983, abandoned.

[51] Int. Cl.⁴ .............................................. B25J 15/00
[52] U.S. Cl. ...................................... 294/88; 294/106; 294/115
[58] Field of Search ...................... 294/88, 95, 97, 106, 294/115, 116; 414/753; 901/31, 36, 37, 38, 39; 269/34, 218, 233, 234

[56] References Cited

U.S. PATENT DOCUMENTS 3,312,496  4/1967  Boutelle et al. ........................ 294/88
3,936,889  2/1976  Hoffmeister ........................... 294/88

FOREIGN PATENT DOCUMENTS

2916312  4/1979  Fed. Rep. of Germany ........ 294/88

Primary Examiner—James B. Marbert
Attorney, Agent, or Firm—George A. Gust

[57]  ABSTRACT

Gripping apparatus includes a supporting body having a pair of spaced generally parallel jaws independently mounted thereon for movement toward and away from each other. An actuating device is reciprocably mounted in the supporting body and between the jaws and is operably connected to the end portions of the jaws to move them toward and away from each other upon reciprocal movement of the actuating device. The body is in the form of a cylinder and a fluid operated, doubleacting piston is reciprocably received therein and connected to the actuating device for the reciprocation thereof. The jaws extend longitudinally of the cylinder on diametrically opposite sides thereof and the actuating device extends axially of the piston.

16 Claims, 20 Drawing Figures

GRIPPER APPARATUS

This is a continuation of application Ser. No. 517,329, filed July 26, 1983; now abandoned.

BACKGROUND OF THE INVENTION

1. Field of the Invention

The present invention relates to pneumatic and hydraulic operating gripping apparatuses, and more particularly to a gripping apparatus having two levers selectively movable toward and away from each other by an actuating member disposed between the levers and connected to a pneumatically or hydraulically operated piston assembly.

2. Description of the Prior Art

Various types of pneumaticlly or hydraulically operated grippers are available generally including a power cylinder having a piston rod projecting from one end of a cylinder body with two opposed jaws movably mounted on the cylinder body end for movement toward and away from each other. The jaws are operably connected to the piston rod, reciprocation of the piston and piston rod causing the jaws to move toward and away from each other.

SUMMARY OF THE INVENTION

The present invention relates to a gripping apparatus including a supporting body having a pair of spaced, generally parallel levers independently mounted thereon for movement toward and away from each other. An actuating member is reciprocably disposed between and operably connected to the levers for moving the levers in unison toward and away from each other in response to reciprocable movement of the actuating member. Means are provided for reciprocating the actuating member to thereby operate the levers.

In one embodiment of the invention, the body is in the form of a cylinder and the reciprocating means is a piston reciprocably received thereby. The levers are mounted for pivotal movement toward and away from each other about spaced and parallel pivot axes. The levers extend longitudinally of the piston on diametrically opposite sides thereof and the actuating member extends axially thereof.

In another embodiment of the invention, the body is again in the form of a cylinder and the reciprocating means is a piston reciprocably received thereby, and the levers are mounted for lateral movement toward and away from each other while maintaining their parallel relationship. A cam means is provided at the operative connection between the actuating member and the levers to move the levers toward and away from each other in a direction perpendicular to the axis of the piston upon reciprocation of the actuating member.

It is an object of this invention to provide pneumatically or hydraulically operated gripping apparatuses having movable levers operated by an actuating member disposed therebetween upon reciprocation of the actuating member by a piston mounted in a cylinder body.

It is another object of this invention to provide such gripping apparatuses which are simple in design, economical to manufacture, and durable in operation.

The above-mentioned and other features and objects of this invention and the manner of obtaining them will become more apparent and the invention itself will be best understood by reference to the following description of an embodiment of the invention taken in conjunction with the accompanying drawings.

DETAILED DESCRIPTION

Figure 2:
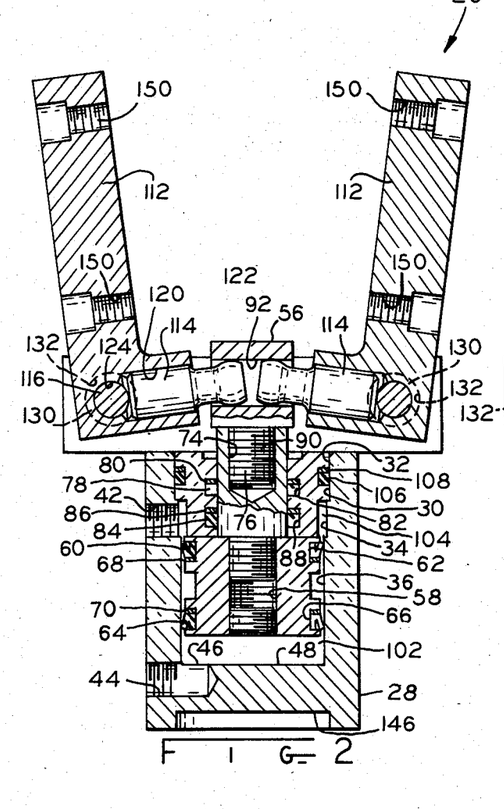
FIG. 2 is a longitudinal sectional view of the embodiment of FIG. 1 with the jaws in the open position.
Figure 3:
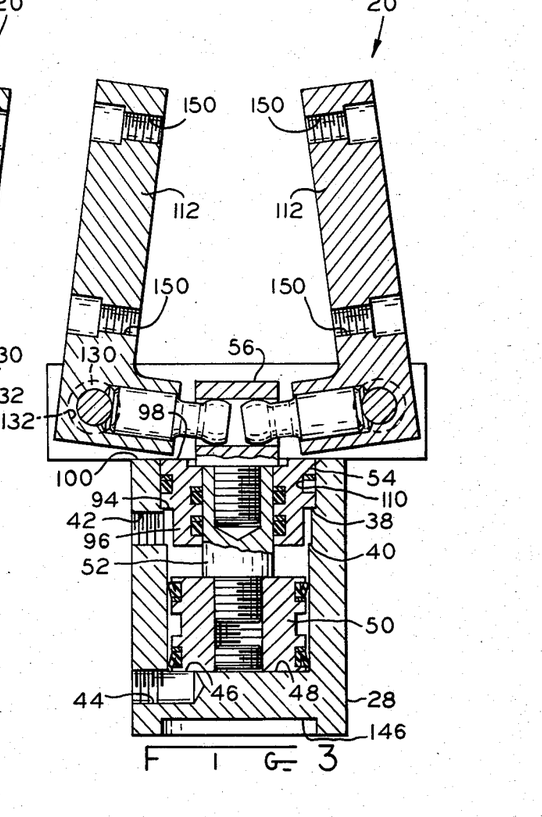
FIG. 3 is similar to FIG. 2 with the jaws in the closed position.
Figures 4, 5, 6:
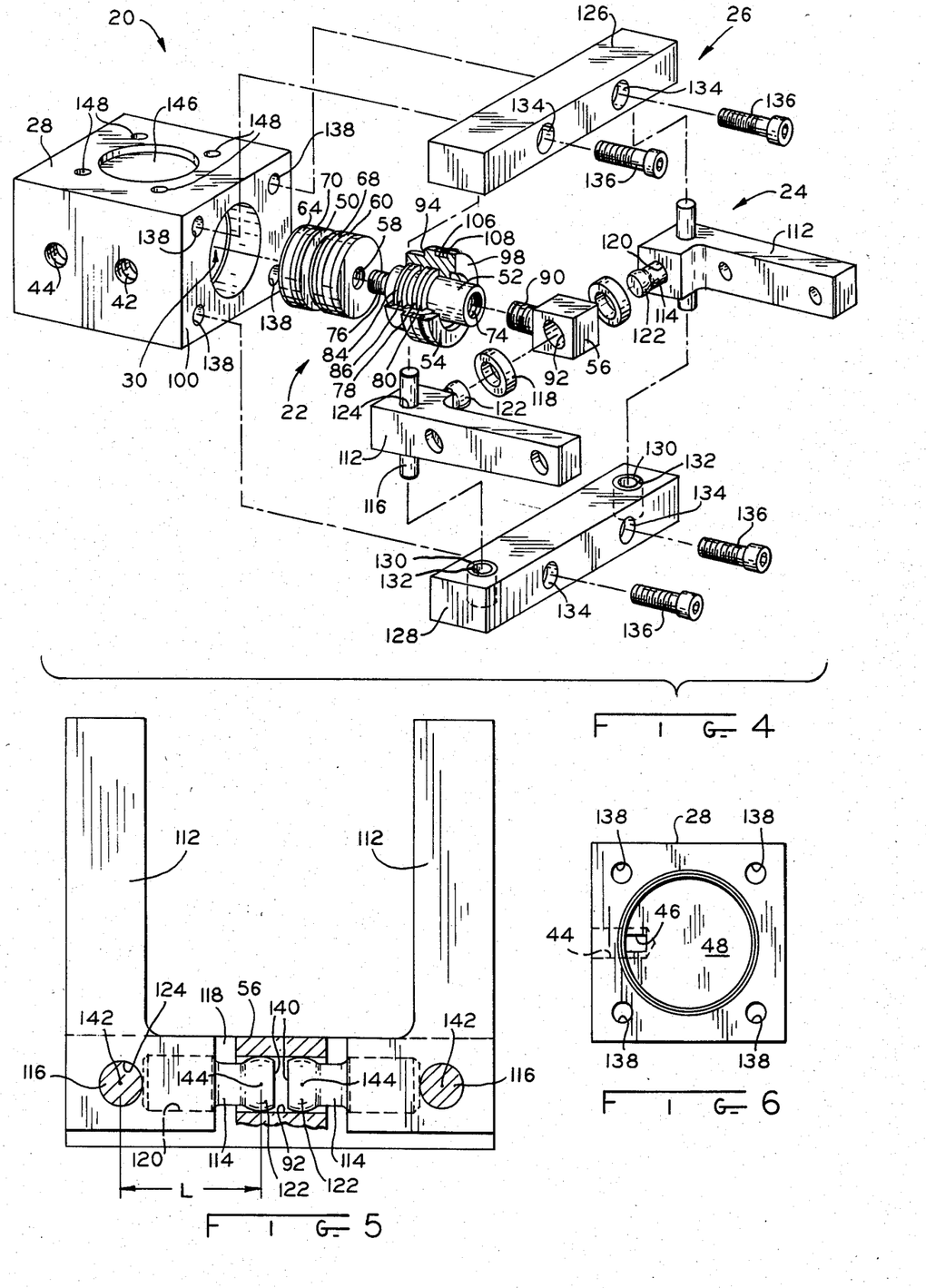
FIG. 4 is an exploded view of the embodiment of FIG. 1.
FIG. 5 is a fragmentary longitudinal sectional view of the jaw assembly of the embodiment of FIG. 1.
FIG. 6 is a top plan view of the open ended body of the embodiment of FIG. 1.

Referring initially to FIGS. 1-6, and particularly FIG. 4, gripping apparatus 20 of the present invention is illustrated generally comprising three main subassemblies, namely piston subassembly 22, jaw subassembly 24, and block subassembly 26.

The three subassemblies 22, 24, 26 are generally supported by open ended body 28 having blind bore 30 therein. Bore 30 has formed therein counterbores 32, 34, 36 (FIG. 3); counterbore 32 being greater in diameter than counterbore 34 to thereby form annular shoulder 38 therebetween, and counterbore 34 being greater in diameter than counterbore 36 to form annular shoulder 40.

Referring to FIGS. 2, 3, and 6, body 28 has port 42 disposed therein and communicating with bore 30 through counterbore 34, and a second port 44 communicating with bore 30 through opening 46 in bottom 48 of bore 30.

Referring now to FIGS. 2, 3, and 4, piston subassembly 22 comprises piston 50, piston rod 52, bushing 54, and dog retainer 56. Piston 50 is reciprocably received within counterbore 36 to form a double acting cylinder in bore 30, and further has threaded bore 58 axially disposed therein. Piston 50 is sealed against the inner surfaces of counterbore 36 by block vee seal 60 in companion groove 62 and block vee seal 64 in companion groove 66. Two additional seal backups, backup 68 and backup 70 are received within companion grooves 62, 66, respectively, and are axially inwardly disposed towards each other relative to block vee seals 60, 64. Block vee seals 60, 64 are disposed within their respective companion grooves 62, 66 so as to face opposite directions, each one facing a direction of applied fluid pressure.

Continuing to refer to FIGS. 2, 3, and 4, piston rod 52 has threaded bore 74 disposed in one end thereof and threaded end 76 on the opposite end thereof which is threadedly secured in bore 58 of piston 50. Bushing 54 is slidably received over piston rod 52 and sealed thereagainst by block vee seal 78 and seal backup 80 in companion groove 82 and block vee seal 84 and seal backup 86 in companion groove 88 of bushing 54. Backup 80 is disposed above block vee seal 78 and backup 86 is disposed above block vee seal 84 as viewed in FIGS. 2 and 3.

Dog retainer 56 has threaded end 90 which is threadedly secured in bore 74 of piston rod 52 to complete the assembly of piston subassembly 22. Dog retainer 56 also has cylindrical opening 92 disposed therein with the longitudinal axis of opening 92 being generally perpendicular to the longitudinal axis of piston rod 52.

Bushing 54 has bushing shoulder 94 formed at the juncture of bushing neck 96 with bushing 54, and upon reciprocably recieving piston 50 in counterbore 36, bushing 54 is supported in bore 30 by bushing shoulder 94 engaging shoulder 38 formed between counter bores 32, 34. Bushing 54 is seated within bore 30 such that surface 98 of bushing 54 is coplanar with surface 100 of body 20 (FIGS. 2, 3). Further, two variable volume chambers are formed upon assemblying piston subassembly 22, namely fluid chamber 102 communicating with port 44 and annular fluid chamber 104 communicating with port 42. Fluid chamber 102 is defined by bore 36 and the bottom surface of piston 50, and annular fluid chamber 104 is generally defined by bushing neck 96 and bores 30, 34. Bushing 54 is sealed against counterbore 32 by O-ring 106 and seal backup 108 in companion groove 110 of bushing 54.

There are two jaw subassemblies 24, each one comprising an L-shaped jaw 112, a dog 114, a pivot pin 116 and a seal 118. A description of only one jaw assembly 24 will be given since both are identical except for the placement of individual jaws 112 on diametric sides of piston subassembly 22. Each dog 114 is press fitted in a jaw socket 120 disposed in jaw 112, and has a generally spherically shaped remote end portion 122. Pivot pin 116 is disposed in elbow hole 124 in jaw 112, the axis of elbow hole 124 being perpendicular to the axis of jaw socket 120. Finally, seal 118 is disposed on dog 114 between its remote end portion 122 and the end of the shorter arm of jaw 112.

Each jaw assembly 24 is assembled to piston subassembly 22 by inserting dog 114 in respective opposite ends of cylindrical opening 92 in dog retainer 56 as illustrated in FIGS. 2, 3, and 5.

Block subassembly 26 comprises two bushing blocks 126, 128, each one having two sleeve bearings 130 received in respective openings 132 in opposite ends thereof. Additionally, each bushing block 126 and 128 has two clearance openings 134 for receiving respective cap screws 136.

Block subassembly 26 is then assembled to jaw subassemblies 24 by receiving the respective remote end portions of pivot pins 116 in respective bearings 130. Bushing blocks 126, 128 are then secured to body 28 by threadedly engaging cap screws 136 in respective threaded holes 138 in surface 100 of body 28. When bushing blocks 126, 128 are secured to body 28, they abut against and secure bushing 54 in bore 30. Consequently, bushing blocks 126, 128 uniquely serve two purposes, one being to support jaw subassemblies 24 during the operation thereof and the other to secure bushing 54 in bore 30. In addition, it should be noted that openings 132 in bushing blocks 126, 128 are closed to aid in maintaining the lubricant properties of respective bearings 130.

Referring now to FIGS. 2, 3, and in particular to FIG. 5, spherical remote end portions 122 of respective dogs 114 have respective planar surfaces 140 in facing relationship with each other, and the diameters of remote end portions 122 are just slightly less than the diameter of cylindrical opening 92 to form an arrangement similar to a ball-and-socket joint. This compensates for angular misalignment between the longitudinal axes of dogs 114 and the longitudinal axis of cylindrical opening 92 upon assembly of apparatus 20, and, upon reciprocation of dog retainer 56, permits spherical remote end portions 122 to rotate and slide within cylindrical opening 92.

Referring to FIG. 5, the purpose of planar surfaces 140 is to allow jaws 112 to be as close as possible without decreasing the pivot arm distance L between respective pivot axes 142 of pivot pins 116 and respective pivot centers 144 of dogs 114. Although the distance between planar surfaces 140 is exaggerated in FIG. 5, it is clear that by providing planar surfaces 140, spherical remote end portions 122 may be more closed spaced together than if they were completely spherical in shape. This compact assembly is considered one of the unique features of the present invention in that the pivot arm distances "L" remain relatively the same while moving jaws 112 close together.

As described, gripping apparatus 20 is fully assembled and remains only to be secured to an operating apparatus (not shown) for providing pressure fluid to ports 42, 44 for the operation thereof. In mounting gripping apparatus 20, body 28 is provided with three pilot holes 146 disposed in three different surfaces of body 28, the surfaces being perpendicular to each other. Four threaded openings 148 are arranged about each pilot hole 146 for receiving respective cap screws (not shown). Upon mounting apparatus 20, a male stud (not shown) is received in a respective pilot hole 146 and apparatus 20 is secured in place by cap screws (not shown) threadedly received through a mounting plate (not shown) and in respective openings 148. Pilot holes 146 serve to aid in mounting apparatus 20 and to carry or absorb the major load forces during the operation thereof.

In operation, pressure fluid is selectively introduced alternately through port 42 into annular fluid chamber 104 and port 44 to fluid chamber 102 to reciprocate piston 50 within bore 30. Upon reciprocation of piston 50, piston rod 52 is reciprocated in bushing 54 and dog retainer 56 is likewise reciprocated to pivot jaws 112 about their pivot axes 142. FIG. 2 illustrates the position of jaws 112 when pressure fluid has been introduced into fluid chamber 102 to move piston 50 upwardly, and FIG. 3 illustrates the reverse wherein pressure fluid has been introduced into annular fluid chamber 104 to move piston 50 downwardly. In each case, the spherical remote end portions 122 slide and rotate within cylindrical opening 92 upon reciprocation of dog retainer 56.

If desired, apparatus 20 may be modified wherein only one jaw 112 is pivotal by disengaging the other jaw 112 and securing it in a stationary position.

Gripping apparatus 20 may be made of any suitable materials, but it is preferred that bushing 54 be made of bearing bronze and, piston rod 52, pivot pins 116 and dog retainer 56 be made of a steel material, and body 28, bushing blocks 126, 128, jaws 112 and piston 50 be made of an aluminum material.

As described, gripping apparatus 20 is uniquely advantageous in several respects. First, apparatus 20 is less costly to produce due to its unique simplicity of design. For example, as earlier indicated, bushing blocks 126, 128 serve not only to act as a support for jaw subassemblies 24, but also to secure bushing 54 within bore 30, thereby eliminating additional structural elements. Furthermore, apparatus 20 has a minimum number of operating or moving elements to simplify the production and maintenance thereof, thereby reducing costs.

A second advantage of gripping apparatus 20 is its durability in that the moving parts are sealed to maintain the lubricant therein and to prevent the entry of dust and other foreign particles. For example, rubberlike seals 118 serve to maintain the lubrication applied to dogs 114 and dog retainer 56 upon assembly, and closed openings 132 in bushing blocks 126, 128 serve likewise for oil impregnated bearings 130.

Thirdly, gripping apparatus 20 is capable of being compactly assembled because of planar surfaces 140 on spherical remote end portions 122 of dogs 114 and the placement of piston subassembly 22 between pivot axes 142 of respective jaws 112. Planar surfaces 140 permit jaws 112 to be more closely spaced together without decreasing the lengths of pivot arm distances L, thereby providing greater power than prior art apparatuses of equal size.

Another advantage of gripping apparatus 20 is the virtual elimination of backlash. Backlash generally will occur at two places, one being between pivot pins 116 and openings 132 in bushing blocks 126, 128, and the other between dogs 114 and dog retainer 56. By providing bearings 130 in openings 132, minimal clearance is provided between pivot pins 116 and respective bearings 130 to essentially eliminate lateral or radial movement of pins 116 in bushing blocks 126, 128. Similarly, the ball-and-socket joint of dogs 114 in cylindrical hole 92 compensates for any axial or other misalignment between dogs 114 and dog retainer 56 as earlier described. Referring now to FIGS. 11, 12, 13 and 14, a second embodiment of the present invention is illustrated in the form of gripping apparatus 152, which is generally of a smaller scale than gripping apparatus 20. Gripping apparatus 152 is similar to apparatus 20 in that it has body 154 with bore 156 therein for reciprocably receiving piston assembly 158. Piston assembly 158 comprises piston 160 having a piston seal 162 received in companion groove 164 and a threaded bore 166 axially disposed therein. Piston rod 168 has threaded end 170 secured within threaded bore 166, and set screw 172 disposed on its end opposite from threaded end 170. Piston rod 168 may be secured to piston 160 other than by threaded engagement, and set screw 172 may be integral to piston rod 168. Set screw 172 has hex head opening 174 axially disposed in its remote threaded end portion 176.

Piston assembly 158 comprises bushing 178 having a narrow bushing neck 180 forming bushing shoulder 182 and slidably receives piston rod 168 in opening 184 axially disposed therein. Seal 188 is received in companion groove 190, 192 in bushing 178 and seal piston rod 168 in opening 184. Pin retainer 194 having threaded hole 196 is threadedly engaged with threaded end portion 176 of set screw 172, and has oppositely disposed slots 198, 200 therein, the axes of slots 198, 200 being parallel and generally perpendicular to the axis of threaded hole 196.

With piston 160 and bushing 178 received in bore 156 of body 154, bushing shoulder 182 engages bore shoulder 202 formed by counterbore 204 in bore 156. Bushing 178 is secured within bore 156 by snap-ring 206 snap-fitted in circular groove 208 in bore 156, and is sealed against bore 156 by O-ring 210 in groove 156.

Piston 160 and bushing 178 define in bore 156 fluid chamber 214 communicating with port 216 through opening 218 and annular fluid chamber 220 communicating with port 224. Chambers 214 and 220 are variable volume chambers into which a pressure fluid is selectively introduced alternately through ports 216, 224, respectively, to reciprocate piston 160 in bore 156.

Body 154 has two parallel spaced apart wall-like projections 226, 228 extending axially of and on diametrically opposite sides of bore 156, and two lugs 230, 232 disposed between such projections 226, 228 on diametrically opposite sides of bore 156. Disposed in projection 226 and lug 232, and projection 228 are holes 234, 236, 238, respectively, in axial alignment with each other, and disposed within projection 226, lug 230 and projection 228 are holes 240 and 242, respectively, (the hole in lug 230 not being shown) in axial alignment with each other.

Apparatus 152 is provided with two jaws 244, 246 pivotally connected between projections 226, 228 and lugs 230, 232. For example, jaw 244, which is generally L-shaped, has an elbow hole 248 disposed therein and a pin 250 press fitted into another hole 252. Pin 250 is received in slot 198 in pin retainer 194 (FIG. 13) and jaw 244 is received between projection 228 and lug 232 such that hole 236 in lug 232, hole 248 in jaw 224, and hole 238 in projection 228 are in axial alignment to receive pivot pin 255 (FIG. 13) therein. Pivot pin 255 is pivotably secured within holes 236, 248, 238 in any suitable manner.

In a similar manner, jaw 246 has pin 251 (FIG. 13) received in slot 200 of pin retainer 194, and is received between projection 226 and lug 230 such that hole 240 is aligned with a hole (not shown) in jaw 246 and lug 230 to receive pivot pin 254 therein.

In operation, pressure fluid is alternately introduced through ports 224, 216 to reciprocate piston 160, piston rod 168, and pin retainer 194. Upon reciprocation of pin retainer 194, pins 250, 251 are moved up and down as viewed in FIGS. 12 and 13 to pivot jaws 244, 246 about their respective pivot pins 254, 255.

By disposing pins 250, 251 of jaws 244, 246 on opposite sides of pin retainer 194 from respective pivot pins 255, 254, the length of lever arm L (FIG. 14) of each jaw 244 and 246 is greater than if pins 250, 251 were on the same side of pin retainer 194 as their respective pivot pins, thereby maximizing the gripping force of gripping apparatus 152. Moreover, the gripping force provided by gripping apparatus 20 is much larger than most prior art devices of similar size.

Angular adjustment of jaws 244, 246 relative to each other is provided by set screw 172 and pin retainer 194. By turning set screw 172 relative to pin retainer 194 by means of hex head opening 174, the axial length of piston assembly 158 may be increased or decreased to vary the length of piston rod assembly consequently the angular adjustment of jaws 244, 246.

Similar to gripping apparatus 20, gripping apparatus 152 may be modified so that only one jaw 244 or 246 is pivotal by disengaging one of the pins 250, 251 from pin retainer 194 and securing its respective jaw in a stationary position.

Figure 14:
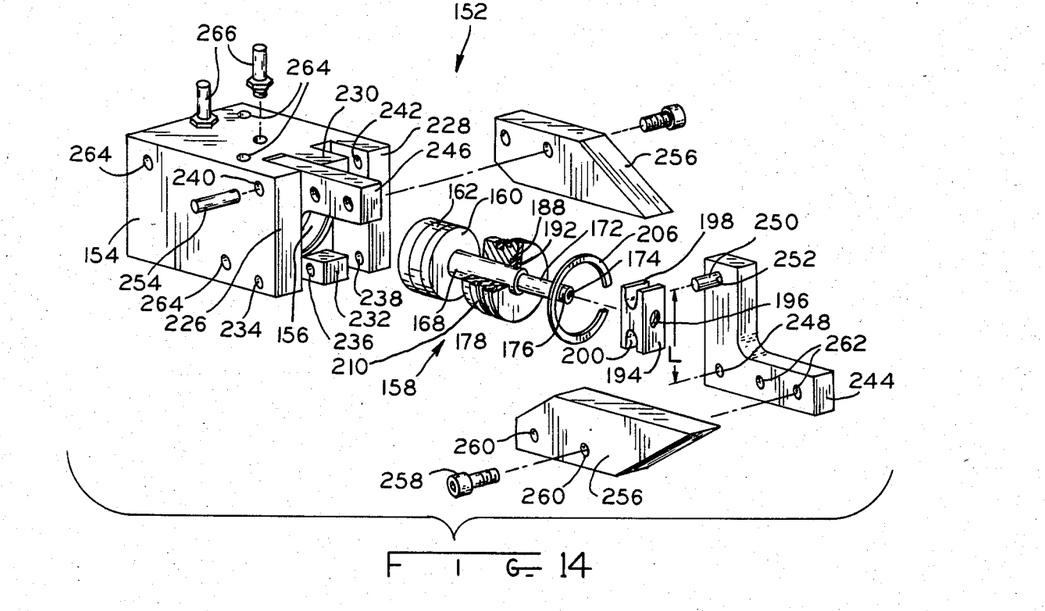
FIG. 14 is an exploded view of the third embodiment.

As illustrated in FIG. 14, and for purposes of illustration only, jaw blanks 254 may be secured to jaws 244, 246 by screws 258 threadedly received in holes 260 and holes 262 in jaws 244, 246.

Gripping apparatus 152 is securely mounted by means of screws (not shown) threadedly received in holes 264 in body 154. Pressure fluid to operate gripping apparatus 152 is supplied by attachments, such as fittings 266.

Referring now to FIGS. 7, 8, 9, and 10, a third embodiment of the present invention is illustrated. Gripping apparatus 268 and gripping apparatus 20 are identical with respect to body 28 and piston subassembly 22 except that the piston length differs and dog retainer 56 is substituted with cam bar 270. Therefore, identical reference numerals have been used where appropriate, and a description of body 28 and piston subassembly 22 for gripping apparatus 268 will not be made.

Cam bar 270 has threaded end 272 threadedly secured in threaded bore 74 of piston rod 52, and has two cam slots 274, 276 disposed therein and angularly disposed relative to the longitudinal axis of piston subassembly 22 as illustrated. Two generally L-shaped jaws 278, 280 are provided having respective recesses 282, 284 for slidably receiving opposite ends of cam bar 270 therein. Cam slots 274, 276 are received within respective recessed 282, 284, and a cam pin 286 is received through openings 288 in jaw 278 and cam slot 274. A second cam pin 287 (FIG. 9) is likewise received in openings 290 of jaw 20 and cam slot 276.

Each jaw 278, 280 has a pair of oppositely disposed tracks therein; jaw 278 having tracks 292, 294, and jaw 280 having tracks 296, 298. The remote ends of each cam pin 286, 287, which are received through jaws 278, 280, are substantially coplanar with the innersurfaces of tracks 292, 294, 296, 298 so as not to extend therebeyond for purposes described hereinafter. surfaces thereof. Aluminum bushing blocks 300, 302 have respective hardened alloy steel guides 304, 306 received in respective grooves 308, 310 disposed therein. Each of the bushing blocks 300, 302 have two countersunk clearance holes 312 in axial alignment with threaded blind holes (not shown) in respective guides 304, 306, and cap screws 314 are received through respective holes 312 and threadedly secured in the respective openings (not shown) of guides 304, 306 to secure guides 304, 306 in respective bushing blocks 300, 302.

Bushing blocks 300, 302 are positioned on opposite sides of jaws 278, 280 such that guide 304 is received in tracks 292, 296 of jaws 278, 280, respectively, and guide 306 is likewise received by tracks 294, 298 of respective jaws 278, 280. Blocks 300, 302 are secured against jaws 278, 280 and cam bar 270 by two cap screws 316 received through respective clearance holes 318 in blocks 300, 302 and holes 317 in guides 304, 306 and threadedly received by respective jaw nuts 320, only one of which is illustrated. Jaws 278, 280 are laterally disposed between cap screws 316, and when jaws 278, 280 are in the open position cap screws 316 are received in grooves 322, 324 of respective jaws 278, 280 (FIG. 8).

Bushing blocks 300, 302 abut against and secure bushing 54 in bore 30, and are themselves secured to body 28 by four cap screws 326 (only one of which is illustrated) received through openings 328 in blocks 300, 302 and threadedly secured in threaded holes 138 of body 28. Cover plate 330 is secured to bushing blocks 300, 302 by six cap screws 332 received through respective holes 334 in cover plate 330 and threadedly secured in threaded holes 336 in blocks 300, 302. Slots 338 in cover plate 330 receive the remote end portions of jaws 278, 280 during the operation of apparatus 268. Cover plate 300 serves to protect moving parts from dirt and other dust particles, and to preserve lubricants applied to the parts.

Figure 7:
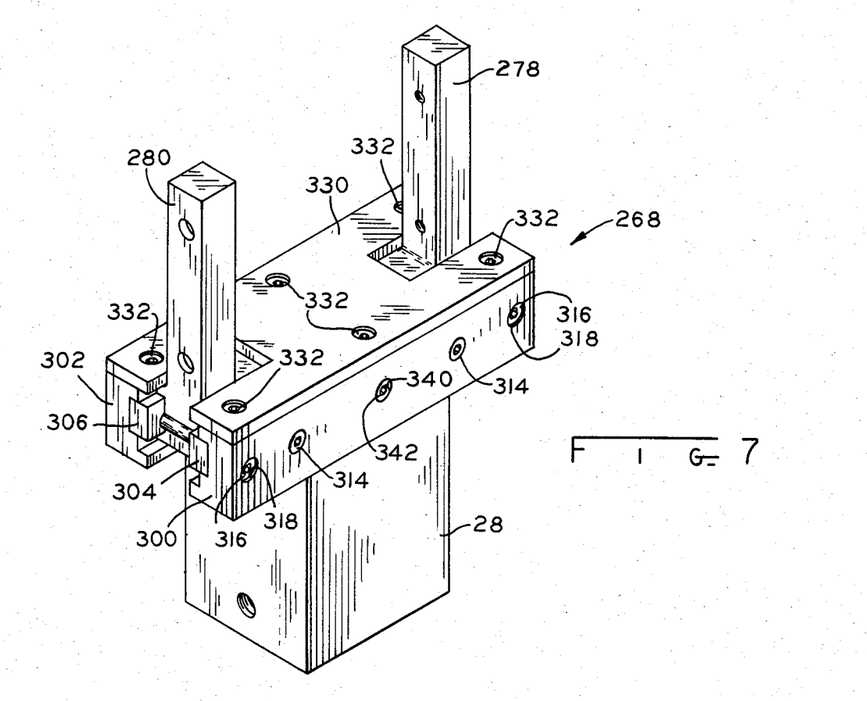
FIG. 7 is a perspective view of a second embodiment of the present invention.

Referring to FIG. 7, each bushing block 300, 302 has centrally disposed therein a lubricating hole 340 with a plug 342 threadedly secured therein. By removing plugs 342, a lubricant may be easily applied to the moving parts through lubricating holes 340, thereby eliminating the necessity of complete disassembly for lubricating purposes.

Figure 8:
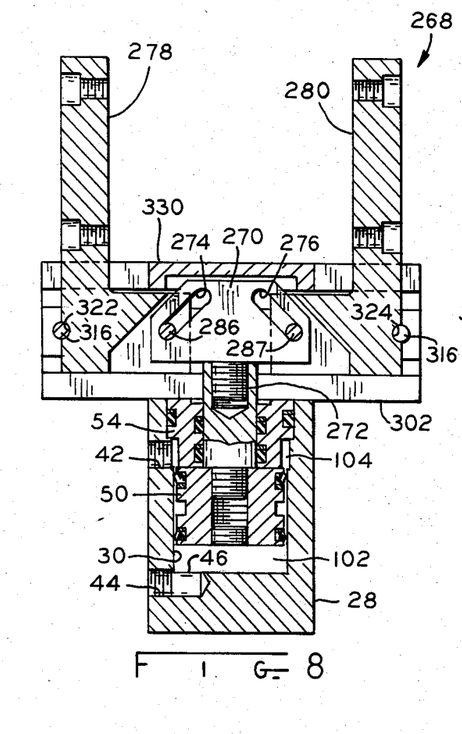
FIG. 8 is a longitudinal sectional view of the second embodiment with the jaws in the open position.
Figure 9:
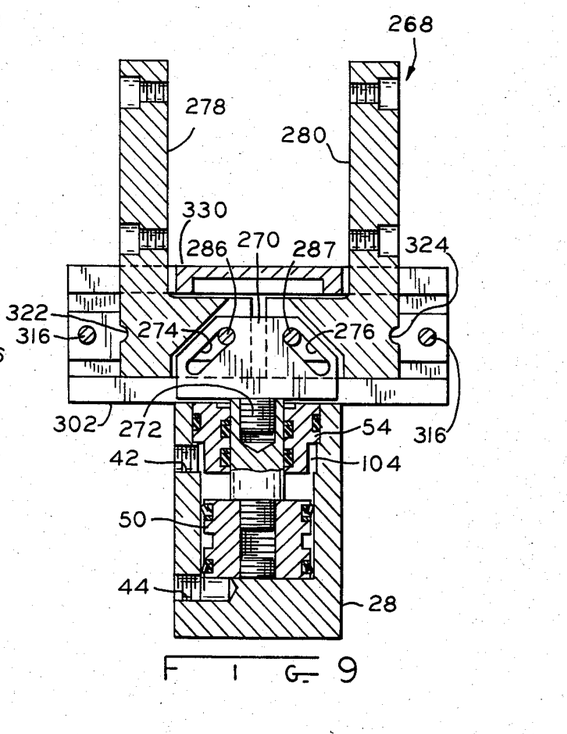
FIG. 9 is similar to FIG. 8 with the jaws in the closed position.

In operation, a pressure fluid is alternately applied through ports 42, 44 and into annular fluid chamber 104 and fluid chamber 102 to reciprocate piston 50 in bore 30 (FIG. 8). Upon reciprocation of piston 50, cam bar 270 moves up and down as illustrated in FIGS. 8 and 9. Reciprocation of cam bar 270 causes cam slots 274, 276 to act against cam pins 286, 287 to move jaws 278, 280 laterally back and forth along guides 304, 306 while maintaining their parallel relationship with each other.

By selectively adjusting cap screws 316, which are threadedly engaged with threaded jam nuts 320, backlash may be essentially eliminated during operation of gripping apparatus 268. As with the other described embodiments, one of the jaws 278, 280 may be disengaged from cam bar 270 and secured in a stationary position to modify apparatus 268 to have only one movable jaw Referring to FIG. 10a, an alternative jaw piece is shown. Instead of the jaw pieces each being L-shaped as indicated by numerals 278, 280 in FIG. 10, they are block-shaped as indicated by the numeral 278a: a description of this piece 278a will suffice for both.

Figure 10:
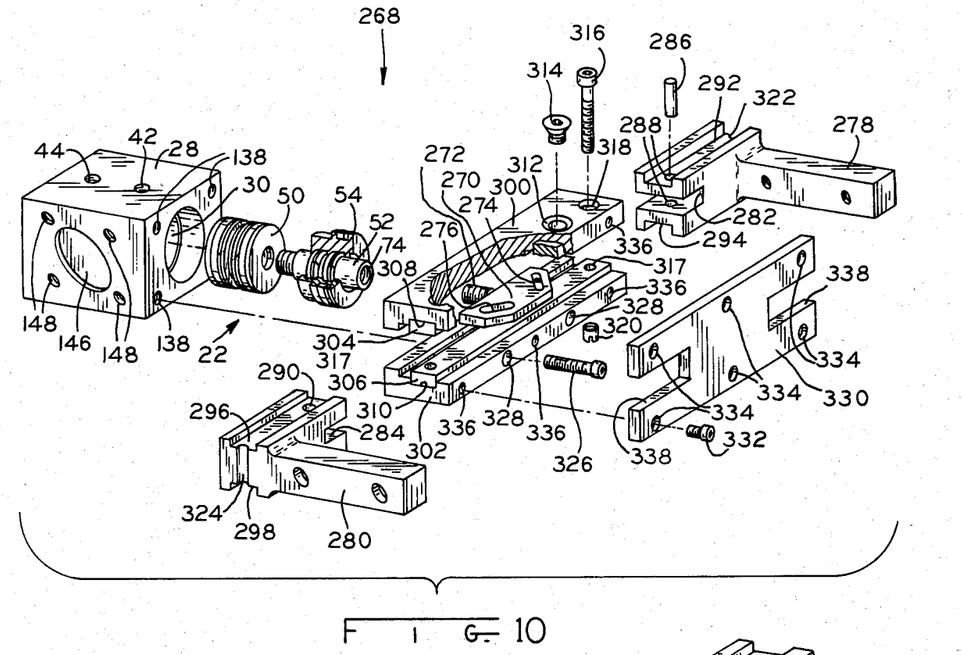
FIG. 10 is an exploded view of the second embodiment.
Figures 10A, 11:
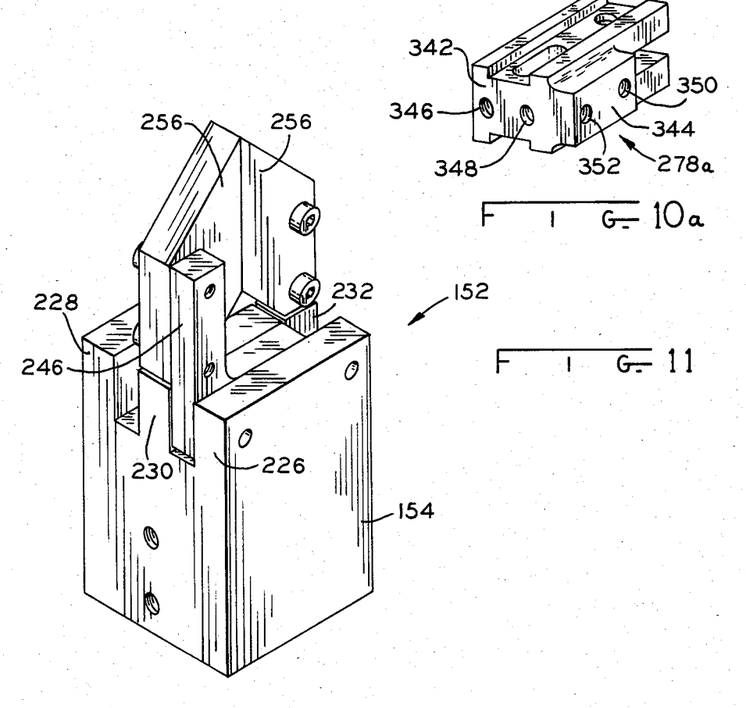
FIG. 10a is a perspective view of a modified jaw part.
FIG. 11 is a perspective view of a third embodiment.
Figure 12:
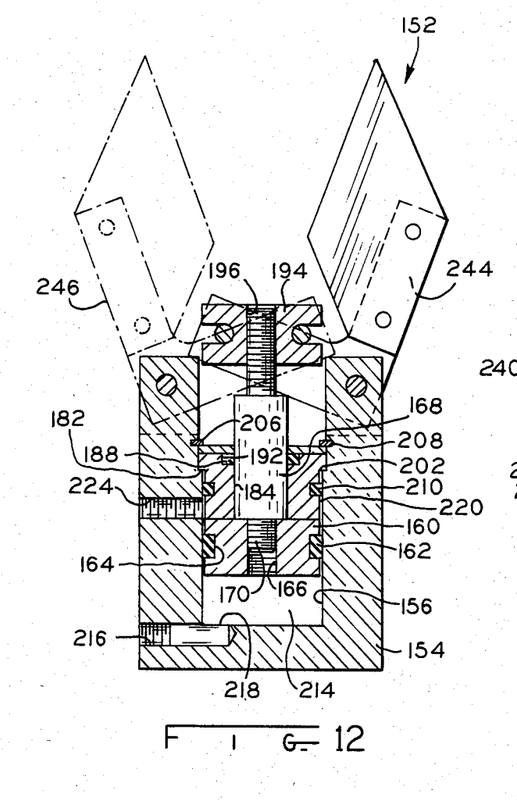
FIG. 12 is a longitudinal sectional view of the third embodiment with the jaws in the open position.
Figure 13:
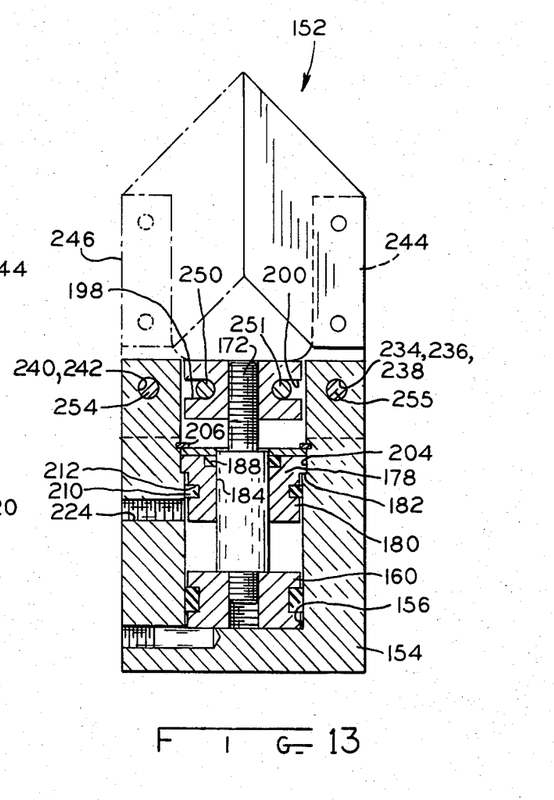
FIG. 13 is similar to FIG. 12 with the jaws in the closed position.

The end and front surfaces 342 and 344 are flat and lie in planes which intersect at right angles. Both surfaces are provided with threaded bores 346 to 352 to receive threaded fasteners for mounting jaw parts (not shown but similar to the elongated portions of jaws 278, 280). Such jaw parts may be of any suitable size and shape depending upon the use to which the gripper is to be put, and the surfaces 342, 344 accommodate desired mounting thereof.

Figure 1:
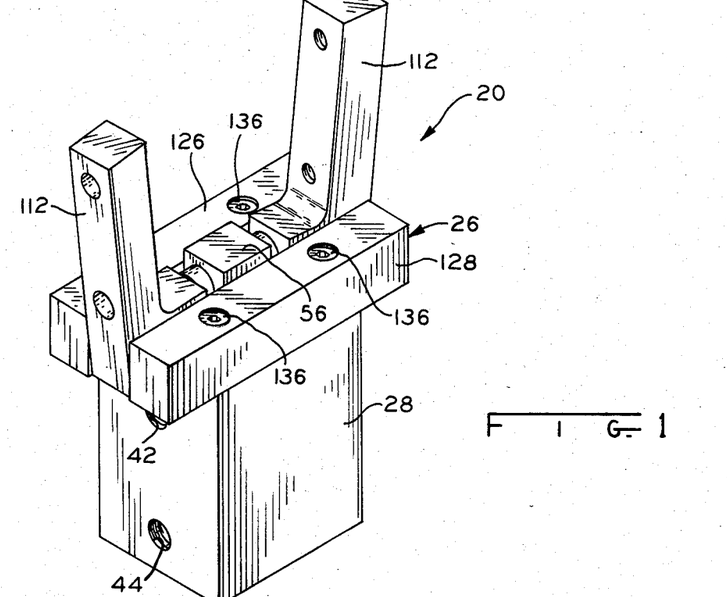
FIG. 1 is a perspective view of one embodiment of the present invention.
Figure 15:
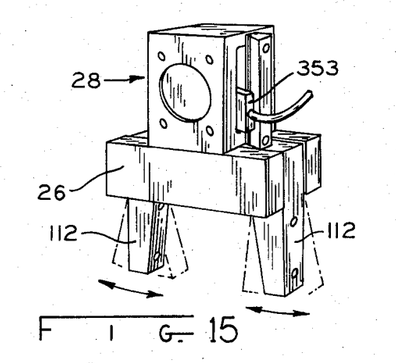
FIG. 15 is a perspective illustration of one of the embodiments of this invention but showing a piston-actuated proximity switch mounted thereon.

Referring to FIG. 15, the gripper thereshown is like that of FIGS. 1 through 3 but in fact may be of any of the other embodiments, as will become obvious from the description that follows. On one side of the cylinder body 28 is mounted a proximity switch 353 which is adapted to sense the position of the piston 50 within the body 28. The proximity switch may be any one of a known variety, such as a magnetically actuated reed switch, a Hall-effect switch, etc. The switch is fixedly secured in place so that it will be actuated upon movement of the piston 50 (See FIGS. 2 and 3) whenever it moves to a precise location within the body 28. Thus, it is important that the switch 353 be capable of being adjusted and fixed along the length of the body in a direction parallel to the axis of the piston movement. Either one or two such switches 353 may be employed, the embodiment of FIG. 15 showing a single switch and those illustrated by FIGS. 16 through 19, two switches. For all practical purposes, essentially the same type mounting arrangement is used for both.

Figure 16:
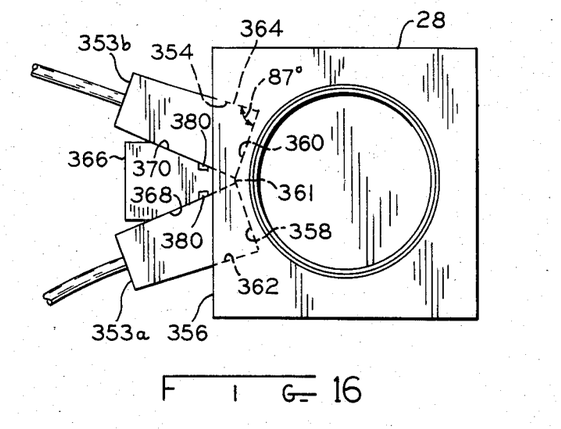
FIG. 16 is an end view of the cylinder body of the gripper of FIG. 15, which is otherwise in FIGS. 1 through 3.
Figure 17:
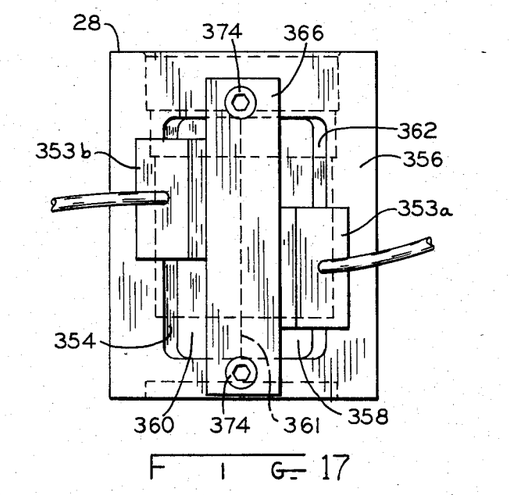
FIG. 17 is a top plan view of the cylinder body of FIG. 16.

With reference to FIGS. 16 and 17, a recess 354 of rectangular outline is formed in one side 356 of the body 28, the recess having sides and a bottom surface as shown. The bottom surface is in two discrete flat portions 358 and 360 which intersect midway between the sides to form a straight-line ridge 361. The sides of the recess 354 as indicated by the numerals 362 and 364 are also flat and lie in planes forming an angle with the bottom portions 358 and 360 of about 87 degrees. As is shown more clearly in FIG. 16, the arrangement thus far described is symmetrical.

In the embodiment shown in FIGS. 16 and 17, two proximity switches 353 and 353b are shown mounted on the flat bottom portions 358a and 360 as shown. These switches are encased in a solidified plastic body, which is preferably molded, to have flat sides which complement the flat surfaces and angles of the recess 354, each switch being essentially of rectangular shape except that in cross-section the sides intersect the bottom forming two angles, respectively, of about 87 degrees. The switches 353a and 353b snuggly fit against the recess sides 362 and 364 while the switch bottoms intimately engage in flush relation the recess surface portions 358 and 360.

These switches are secured in place within the recess by means of a bar-like retainer 366 having two flat angled surfaces 368 and 370 symmetrically arranged and angled to fit flush against the sides of the two switches 353a and 353b as shown in FIG. 16, the opposite ends of the retainer 366 having two bores 372 adapted to receive threaded fasteners 374 which secure the bar to the side 356 of the cylinder 28.

Figure 18:
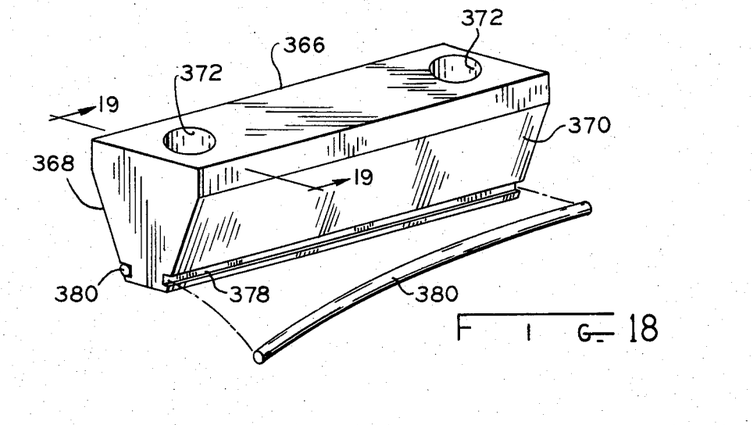
FIG. 18 is a perspective view partially exploded of the switch hold-down bar shown in FIGS. 16 and 17.
Figure 19:
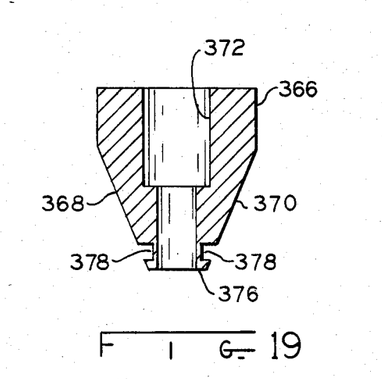
FIG. 19 is a cross-section taken substantially along section line 19—19 of FIG. 18.

The apex portion of the retainer 366 is generally flat as indicated by the numeral 376 and immediately adjacent thereto is provided with two elongated grooves 378 for receiving a bar-like rubber strip 380 as shown in FIGS. 16 and 18. The rubber strip 380 may be compared to a rubber o-ring and is so sized with respect to the respective groove 378 to fit snugly thereinto and to project slightly beyond the respective surfaces 368 and 370. Thus, the rubber strips 380 will frictionally engage the respective sides of the two switches 353a and 353b.

With the bar retainer 366 in place, the two switches 353a and 353b are securely engaged and forced against the respective bottom portions and sides of the recess 354. The switches are thus securely held in place.

For the purpose of adjusting these switches longitudinally of the piston bore, in other words, in a direction parallel to the axis of the piston 50, it is only necessary to loosen the threaded fastener 374 sufficiently to release the binding engagement of the retainer 366 with the switches but yet to permit frictional engagement of the rubber strips 380 with the switch sides. The switches may then be moved longitudinally with respect to the bar retainer 366 to a desired position where they will be temporarily held in place by the frictional engagement of the rubber strips 380. By tightening the threaded fasteners 384, the switches may be securely locked into position.

The embodiment of FIG. 15 discloses the use of only a single switch 353. In this case, only one-half of the recess 354 is utilized and the bar retainer has only one of the surfaces 368, 370. Otherwise, the two designs are identical.

While this invention has been described has having preferred embodiments, it will be understood that it is capable of further modifications. This application is therefore intended to cover any variations, uses, or adaptations of the invention following the general principals thereof, and including such departures from the present disclosure as come within known or customary practice in the art to which this invention pertains and fall within the limits of the appended claims.

What is claimed is:

1. Gripping apparatus, comprising:

a supporting body;

a pair of opposed spaced apart levers, each said lever having a mounting arm and a gripping arm angularly joined together at one of their respective ends, one of said levers being independently pivotally mounted, substantially at the joinder of its said mounting arm and said gripping arm, to said supporting body for pivotal movement of its gripping arm toward and away from the gripping arm of the other of said levers, said other lever being operably mounted to said supporting body;

a distal end of said mounting arm of said one of said levers being formed to have a substantially spherical shape truncated to have a substantially planar surface in direct facing relationship with the mounting arm of said other lever;

an actuating member reciprocably mounted in said supporting body so as to be generally disposed between respective distal ends of said mounting arms of said levers, said actuating member being reciprocable in a direction orthogonal to a line projecting between said respective distal ends, said actuating member including a substantially circularly cylindrical opening therein axially oriented orthogonally to the direction of reciprocation of said actuating member and generally along said line projecting between said respective distal ends, said cylindrical opening being operably coupled to said spherical end of said mounting arm of said one lever toward and away from said other lever upon reciprocable movement of said actuating member;

means for reciprocating said actuating member;

said other lever being independently pivotally mounted substantially at the joinder of its said mounting arm and said gripping arm, to said supporting body, said levers being pivotal toward and away from each other about spaced parallel pivot axes, said actuating member being generally between said pivot axes and likewise operably coupled to said mounting arm of said other lever to pivot said levers toward and away from each other in unison upon reciprocal movement of said actuating member under actuation of said means for reciprocating said actuating member;

said means for reciprocating said actuating member is a piston-cylinder assembly within said supporting body, said piston being connected to said actuating member; and said means including a bushing member for securing said piston in said cylinder, and wherein said apparatus further includes a pair of bushing blocks respectively disposed on opposite sides of and slidably abutting against said mounting arms of said levers, said bushing blocks abutting against said bushing member, said bushing blocks being secured to said supporting body to thereby secure said bushing member in said cylinder, each of said levers being pivotally supported between said pair of bushing blocks by a respective wrist pin received through a hole at the pivot axis thereof and in bearing openings in respective said bushing blocks, said bushing blocks abutting against and reciprocably supporting said actuating member therebetween.

2. The apparatus of claim 1 wherein the substantially spherical ends of said mounting arms of said levers are slidably and rotatably received in opposite sides of said cylindrical opening of said actuating member, the respective planar surfaces of the spherical ends being in direct facing relationship with each other to thereby permit said levers to be closely spaced together without decreasing the length of their respective pivot arms while maintaining a reduced separation between said pivot axes.

3. A gripping apparatus comprising:
a supporting body, having two parallel wall projections outwardly extending orthogonally from a first surface thereof and disposed to be respectively contiguous with opposed adjacent sides thereof and having two lug members outwardly extending orthogonally from the first surface thereof and disposed to be respectively spaced between facing opposed surfaces of respective ends of said wall projections;
a pair of opposed spaced apart levers, each said lever having a mounting arm and a gripping arm angularly joined together at one of their respective ends, one of said levers being pivotally supported between one of said wall projections and one of said lug members by a wrist pin received through a hole in the region of joinder of the mounting arm and the gripping arm of said one level and in respective bearing openings in said one of said wall projections and said one lug member, the other of said levers being pivotally supported between the other of said wall projections and the other of said lug members by a wrist pin received through a hole in the region of joinder of the mounting arm and the gripping arm of said other lever and in bearing openings in said other wall projection and said other lug member, said levers so adapted to pivot about said wrist pins in parallelly spaced apart planes;
an actuating member reciprocably mounted in said supporting body and disposed generally to reciprocate in a plane parallel to and between the planes of pivoting of said levers, said reciprocation being generally in a direction orthogonal to said first surface of said supporting body, said actuating member being operably coupled to said mounting arms of said levers so as to pivot the gripping arms of said levers so as to pivot the gripping arms of said levers toward and away from each other in unison upon reciprocal movement of said actuating member; and
means for reciprocating said actuating member.

4. The apparatus of claim 3 wherein said mounting arms of said levers extend from respective said pivot axes of said wrist pins laterally inwardly on opposite sides of said actuating member, the remote end of each said mounting arm being on the opposite side of said actuating member from its respective said pivot axis and having a pin member extending outwardly therefrom parallel to said pivot axes,
said actuating member having a pair of slots oppositely disposed therein for receiving respective said pin members.

5. The apparatus of claim 4 wherein said reciprocating means is a piston-cylinder assembly in said supporting body and includes a piston rod disposed between said piston and said actuating member, said piston rod being rigidly secured to said piston and threadedly engaged with said actuating member, the stroke of said piston in said cylinder being axially adjustable by threadedly adjusting said piston rod relative to said actuating member, thereby angularly adjusting the pivotal movement of said levers.

6. The apparatus of claim 3, wherein said supporting body includes a cylinder and said means for reciprocating said actuating member is a piston reciprocably received by said cylinder, said levers extending longitudinally of said cylinder on diametrically opposite sides thereof and said actuating member extending axially of said cylinder.

7. The apparatus of claim 6, wherein said piston and said body define two variable volume chambers in said cylinder, said body having two ports therein communicating with respective said variable volume chambers, whereby pressure fluid is selectively introduced alternately in said chambers to reciprocate said piston.

8. The apparatus of claim 7, further comprising:
an elongated bounded recess formed in a side face of said supporting body, substantially aligned with the direction of reciprocation of the piston within said body;
at least one proximity switch adapted to be received at an adjustably predetermined position along the extent of said recess;
a substantially V-shaped bar adapted to be mounted to said body longitudinally of said recess, and adapted to retain said at least one proximity switch within said recess; and
at least one rubber strip extending along such bar in abutting frictional contact between said bar and said at least one proximity switch for retaining said at least one proximity switch in said predetermined position.

9. Gripper apparatus, comprising:
a supporting body,
a pair of opposed spaced-apart levers, each said lever having a mounting arm and a gripping arm angularly joined together at one of their respective ends, one of said levers being independently slidably mounted at its said mounting arm onto said supporting body for lateral movement toward and away from the other said lever which is operably mounted at its said mounting arm onto said supporting body, said gripping arms extending outwardly from said supporting body in a parallel relationship to each other,
an actuating member reciprocably mounted in said supporting body and between said levers,
at least one cam coupled to said mounting arm of said one lever and mounted on said actuating member, said at least one cam being operably disposed to laterally move said one lever toward and away from said other lever upon orthogonally directed reciprocal movement of said actuating member, said gripping arms maintaining their parallel relationship during said movement, and means for reciprocating said actuating member.

10. The apparatus of claim 9 wherein said other lever is independently slidably mounted at its said mouting arm on said supporting body, said at least one cam being likewise coupled to said mounting arm of said other lever so as to be operably disposed to laterally move said levers toward and away from each other in unison upon orthogonally directed reciprocal movement of said actuating member, said gripping arms maintaining their parallel relationship during said movement of both said levers.

11. The apparatus of claim 10 further including a pair of guide blocks on opposite sides of and slidably abutting against said mounting arms of said levers and secured to said supporting body, said levers having on each of their sides abutting said guide blocks one of a track and a rail, and said guide blocks having on each of their sides abutting said levers the other of said track and said rail, said guide blocks slidably supporting said levers therebetween by said rails being slidably received in respective said tracks.

12. The apparatus of claim 11 wherein said guide blocks abut against and reciprocably support said actuating member and said at least one cam therebetween, and wherein said at least one cam includes a cam surface and a cam follower associated with each slidably mounted lever, one of said cam surface and said cam follower being disposed on said actuating member and the other of said cam surface and said cam follower disposed on said mounting arms of said levers.

13. The apparatus of claim 9, wherein said supporting body includes a cylinder and said means for reciprocating said actuating member is a piston reciprocably received by said cylinder, said levers extending longitudinally of said cylinder on diametrically opposite sides thereof and said actuating member extending axially of said cylinder.

14. The apparatus of claim 13, wherein said piston and said body define two variable volume chamabers in said cylinder, said body having two ports therein communicating with respective said variable volume chambers, whereby pressure fluid is selectively introduced alternately in said chambers to reciprocate said piston.

15. The apparatus of claim 14, further comprising:
an elongated bounded recess formed in a side face of said supporting body, substantially aligned with the direction of reciprocation of the piston within said body;
at least one proximity switch adapted to be received at an adjustably predetermined position along the extent of said recess;
a substantially V-shaped bar adapted to be mounted to said body longitudinally of said recess, and adapted to retain said at least one proximity switch within said recess; and
at least one rubber strip extending along such bar in abutting frictional contact between said bar and said at least one proximity switch for retaining said at least one proximity switch in said predetermined position.

16. Gripping apparatus, comprising:
a supporting body;
a pair of opposed spaced apart levers, each said lever having a mounting arm and a gripping arm angularly joined together at one of their respective ends, one of said levers being independently pivotally mounted, substantially at the joinder of its said mounting arm and said gripping arm, to said supporting body for pivotal movement of its gripping arm toward and away from the gripping arm of the other of said levers, said other lever being operably mounted to said supporting body;
a distal end of said mounting arm of said one of said levers being formed to have a substantially spherical shape truncated to have a substantially planar surface in direct facing relationship with the mounting arm of said other lever;
an actuating member reciprocably mounted in said supporting body so as to be generally disposed between respective distal ends of said mounting arms of said levers, said actuating member being reciprocable in a direction orthogonal to a line projecting between said respective distal ends, said actuating member including a substantially circularly cylindrical opening therein axially oriented orthogonally to the direction of reciprocation of said actuating member and generally along said line projecting between said respective distal ends, said cylindrical opening being operably coupled to said spherical end of said mounting arm of said one lever toward and away from said other lever upon reciprocable movement of said actuating member;
means for reciprocating said actuating member;
said piston and said body defining two variable volume chambers in said cylinder, said body having two ports therein communicating with respective said variable volume chambers, whereby pressure fluid is selectively introduced alternately in said chambers to reciprocate said piston;
an elongated bounded recess formed in a side face of said supporting body, substantially aligned with the direction of reciprocation of the piston within said body;
at least one proximity switch adapted to be received at an adjustably predetermined postion along the extent of said recess;
a substantially V-shaped bar adapted to be mounted to said body longitudinally of said recess, and adapted to retain said at least one proximity switch within said recess; and
at least one rubber strip extending along such bar in abutting frictional contact between said bar and said at least one proximity switch for retaining said at least one proximity switch in said predetermined position.

* * * * *